Nov. 1, 1960  W. FÖBUS  2,958,106
CHAPLETS
Filed Dec. 19, 1957  7 Sheets-Sheet 1

INVENTOR
Walter Föbus
by: Michael S. Striker
Attorney

Nov. 1, 1960 W. FÖBUS 2,958,106
CHAPLETS
Filed Dec. 19, 1957 7 Sheets-Sheet 3

INVENTOR
Walter Föbus
by:
Michael S. Striker
Attorney

Nov. 1, 1960 W. FÖBUS 2,958,106
CHAPLETS
Filed Dec. 19, 1957 7 Sheets-Sheet 6
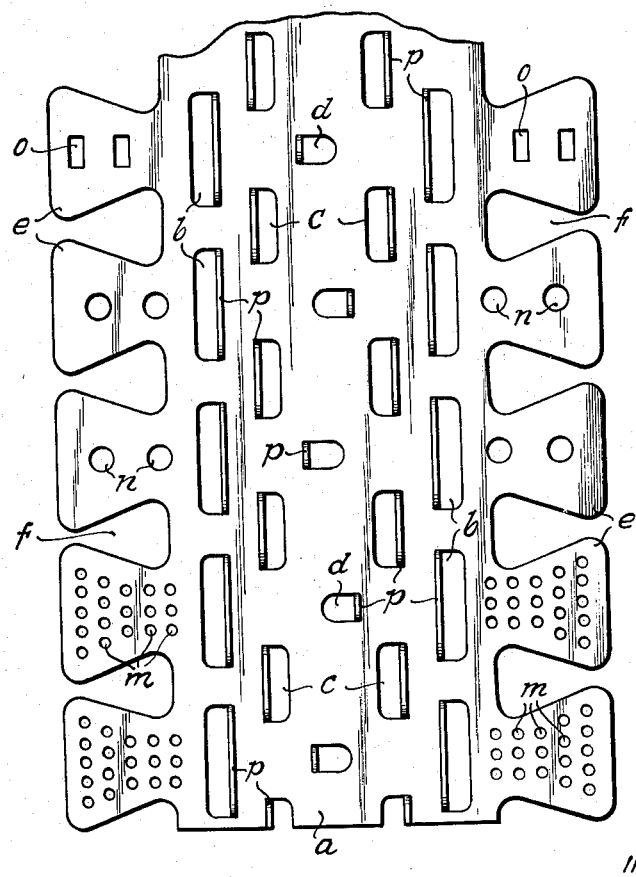

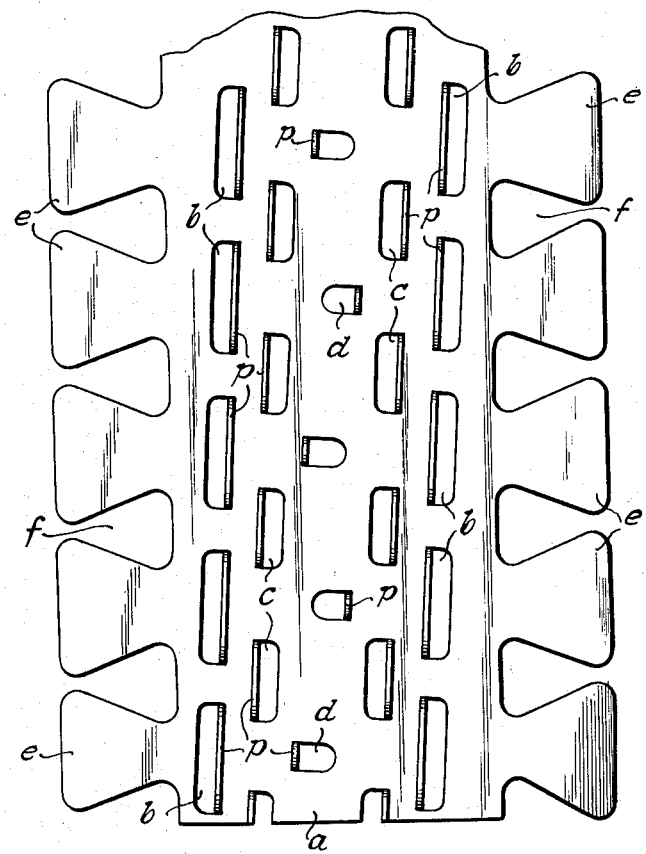

2,958,106
Patented Nov. 1, 1960

2,958,106

CHAPLETS

Walter Föbus, 11 Kleine Schwerter Strasse,
Dortmund-Aplerbeck, Germany

Filed Dec. 19, 1957, Ser. No. 703,821

Claims priority, application Germany Dec. 31, 1956

5 Claims. (Cl. 22—184)

The invention relates to chaplets for supporting the cores used in casting hollow bodies.

The carrying cross-sections or webs of the hitherto used chaplets were round, square, rectangular or of any other section, and to facilitate their assimilation in the molten metal their surfaces were fluted, serrated, notched or roughened in any other way. These carrying cross-sections were themselves carried on one hand by the wall of the mould and on the other hand by the core, or else they afforded mutual support for the cores inside the mould; in all cases, however, they made a break in the total wall thickness of the casting concerned. Castings, which, to suit their ultimate use, had to be dense were thus always attended by the risk of the unavoidable chaplets failing to fuse perfectly with the structure of the casting which thus, in the surrounding of these chaplets, turn out porous so that the casting often had to be scrapped.

According to the law of buoyancy of solids in liquids the cores around which the molten metal flows are pressed against the walls of the mould, or the cores themselves are pressed against one another. Consequently, the carrying cross-sections of the chaplets inserted in the mould box must be able to withstand these buoyancy forces, that is to say that the sum of all forces acting on the carrying cross-sections or webs of the chaplets must not be greater than the compressive strength of these chaplet webs, taking into consideration the heating up of these webs by the surrounding molten metal after founding.

In this connection the heating up of the chaplet webs depends on the casting temperature, on the cooling of the casting in the mould box, on the tendency of the casting or of the chaplet to dissolve in the molten metal surrounding it, on the material of the casting itself, as well as on a series of other factors.

To ensure perfect castings it is therefore necessary, according to the type of casting involved—be it of steel, sphaerosiderite, iron, malleable iron or any alloy metal—and according to the stresses and strains acting on the chaplet webs to suitably select and match the founding material and the chaplet web material to each other so as to ensure optimum fusion and welding and further suitability of the chaplet webs for the stresses and strains involved.

So far no generally applicable rule has been evolved for calculating all factors involved, and the foundry expert is therefore largely dependent on trial-and-error methods. If, for example, the chaplet webs are made too weak, the fusion and welding may be satisfactory but there is a risk of the buoyancy forces being too great for the weak chaplets so that during casting the cores are displaced, which leads to scrap. If, on the other hand, stronger chaplet webs are used, there is no risk of displacement of the cores but satisfactory fusion or welding of the chaplet in the surrounding molten metal becomes problematical. Thus there is a risk of disturbing the gas phase when the molten metal comes into contact with the thick cross-sections of the chaplet webs, owing to the fact that the undercooling due to the oversize chaplet webs releases gases from the casting which as a rule cannot escape freely from the molten metal because solidification has already set in to a certain extent at the walls of the cores and of the mould box. This causes an accumulation of gas bubbles in the vicinity of the chaplets.

The conditions described above make it imperative for chaplets to satisfy the following requirements from the standpoints of pattern making and foundry work:

(1) The carrying cross-sections of the chaplets must not be dimensioned larger than required for a compressive strength greater than is demanded by the buoyancy forces and other stresses and strains occurring in the mould box.

(2) The chaplets should be of a shape such that when the molten metal is poured into the box the metal is not suddenly and strongly cooled or undercooled in the vicinity of the webs; consequently webs of round, square, rectangular or similar shape are unsuitable.

(3) The chaplet webs must be of a kind such that they fuse or weld readily in the molten metal.

All these requirements mentioned above are not fulfilled by the chaplets hitherto used. Consequently, the present invention departs from the accepted practice and proposes to use as carrying cross-sections or chaplet webs substantially spirally or similarly wound strips of sheet metal placed on edge. These spirally wound strips of sheet metal have blanked-out lugs which are turned down at right angles and which serve as supporting ledges or coverplates for the cores within the mould box. Alternatively, these covers may be detached plates covering the top and bottom ends of the sheet metal spirals and fixed thereto. The afore-mentioned spirals can be made of sheet metal of a thickness of up to a few millimetres, and, if desired, of profiled stock so that, for instance, double-cone or oval profiles or sections reinforced by a single or double centre rib are obtained.

The readiness with which the chaplets fuse or weld with the casting is promoted by blanking out cutouts in the spiral metal strips and in the covers.

Chaplets embodying webs of the kind described above offer considerable advantages over the chaplets hitherto conventionally used:

(1) Suitable dimensioning of the spiral or choosing the number of coils of the metal strip enables the compressive strength of the chaplet webs to be adapted to the magnitude of the buoyancy forces acting on the chaplet.

(2) The molten metal can flow through the open spiral and the lateral cut-outs in the metal strips relatively quickly and without hindrance so that it cools off at the walls of the chaplet webs at a rate such that the solidifying casting itself is enabled to take up part of the buoyancy forces, which permits the hitherto used heavy cross-sections of the chaplet webs to be dispensed with. Compared with chaplets having strong webs of, for example, round, square, or similar shape, the use of chaplet webs in the form of sheet metal spirals ensures an equally intense cooling which, however, is not localised but is evenly distributed over a wide area so that undercooling of the casting—and with it any disturbance of the balance of the gas phase within the molten metal—is prevented.

(3) By virtue of the fact that the chaplet webs are relatively thin strips of sheet metal with a plurality of cut-outs, the resulting fusion or welding of the chaplets is particularly good. The cut-outs in the sheet metal spirals are staggered and stepped in respect of one another; they enable the molten metal to wrap itself round the carrying cross-sections in different planes and thus prevent any surfaces failing to fuse, which might give rise or leaks at or in the vicinity of the chaplets.

The cut-outs along the top and bottom edges of the sheet metal spiral can, incidentally, be so located that only small surfaces of the carrying cross-sections are visible. Since these thin metal strips fuse or weld readily with the molten metal surrounding them, the formation of leaks in these zones—which would hinder subsequent machining operations—is likewise prevented.

Chaplets embodying the novel webs according to the invention are adjustable in various respects: thus, the coils of the metal strips can be made tight or loose with a view to increasing the stability of the chaplets. By providing cover plates engaging in suitable cut-outs in the metal spiral such adjustability can be achieved. Furthermore, when the cut-outs along the top edge of the spiral strips are arranged obliquely or spirally, and cover plates are provided which engage in said cut-outs, the level of the latter can be varied by turning the cover plates whereby the height of the chaplet can be altered automatically.

Incidentally, the cut-outs along the edges of the metal spiral can be adapted to the dynamic stresses prevailing during and after founding by making—as far as this is feasible—the cut-outs along the top and bottom edges of the spiral largest, allowing them to diminish towards the centre of the strip of sheet metal.

Several variants of the object of the invention are shown in the accompanying drawings, in which Figs. 1–9 are plan views of different shapes of a spirally wound strip of sheet metal serving as chaplet web, Figs. 10 and 11 are a plan view and elevation respectively of a square cover plate, Figs. 12 and 13 are corresponding views of a round cover plate, Figs. 14–20 show different profiles of the strip of sheet metal used for making the spiral, Fig. 21 is a perspective view of a chaplet web made from a spirally wound strip of sheet metal;

Figs. 22 and 23 are developments of the sheet metal spiral, and

Figs. 24 and 25 are the corresponding end views of the metal spirals shown in Figs. 22 and 23.

Figure 1:
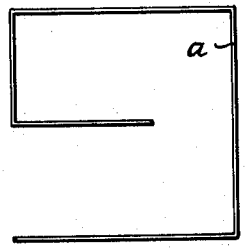
Figure 2:
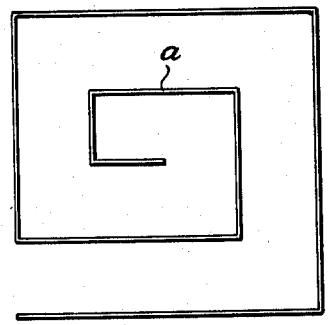
Figure 3:
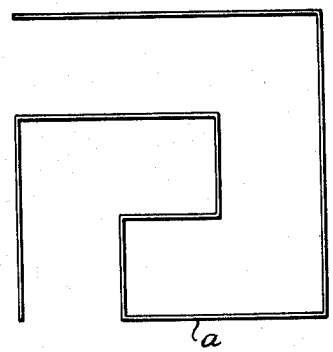
Figure 4:
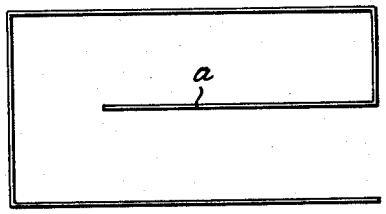
Figure 5:
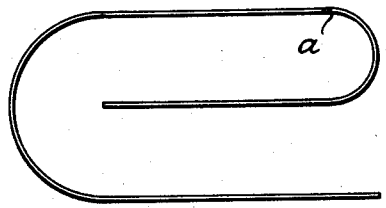
Figure 6:
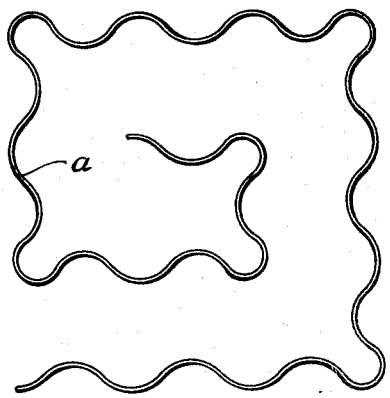
Figure 7:
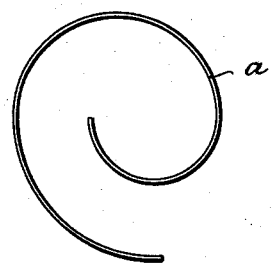
Figure 8:
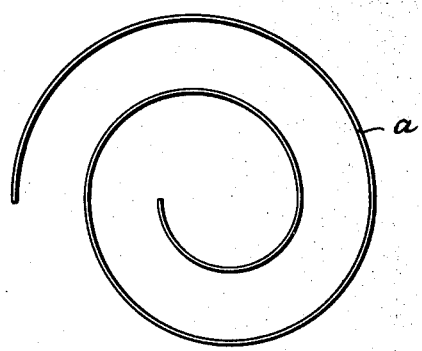
Figure 9:
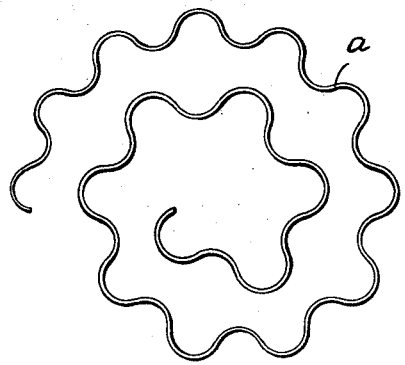

The web of the chaplet according to the invention consists advantageously of a spirally wound strip of sheet metal $a$, having a plurality of coils, which is placed on end on the bearing surfaces on the core and on the walls of the mould box. The spiral may be of round outline, see Figs. 7 and 8, or of square outline, see Figs. 1–4, or it may be flat or oval in outline, see Fig. 5, whereby a streamlined shape is achieved. Finally, the strip of sheet metal may be wound alternatively in any other way, e.g. in meander shape, see Figs. 2 and 3. Furthermore, the metal strip may itself be corrugated, see Figs. 6 and 9. The sheet metal from which the spiral is made may be of any thickness up to a few millimetres, according to the intended use.

Figure 19:
Figure 18:
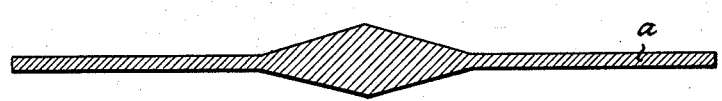
Figure 17:
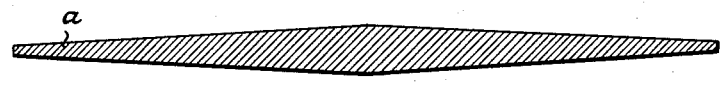
Figure 16:
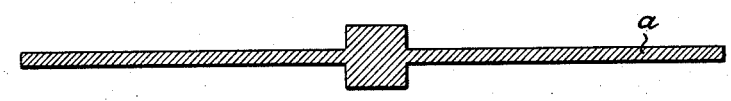
Figure 15:
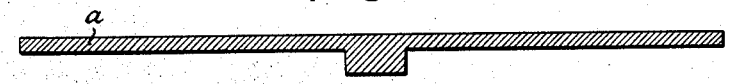
Figure 14:

To reinforce the spiral, the sheet metal from which it is made may be given different profiles, such as double-cone, see Figs. 17 and 18, oval, see Fig. 19, or it may be reinforced by one or two centre ribs, see Figs. 15 and 16.

Along their side walls the sheet metal strips $a$ have cut-outs $b$, $c$, $d$ produced by blanking out and bending down the lugs $p$. These cut-outs in the side walls of the metal strips are advantageously staggered and stepped in respect of one another, as shown in Figs. 22 and 23. Fig. 22 shows the development of the chaplet web according to Fig. 21.

Figure 21:
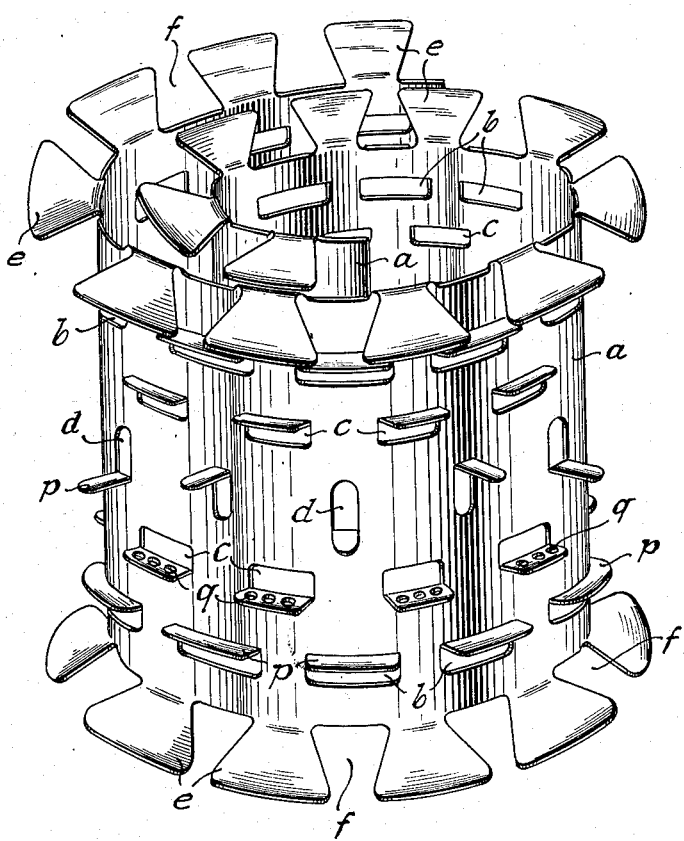

As will be seen from Fig. 21, lugs $e$, turned down at right angles, are provided along the top and bottom edges of the spirals, with which lugs $e$ the chaplet rests on the core and on the wall of the mould, and in this way one-piece chaplets result. It is of advantage to turn down the lugs $e$ slightly below the terminal edges of the sheet metal spiral so that at most a very small portion of the metal spiral remains visible at the mould and core surfaces, breaking through the structure of the casting only at these points. The recesses $f$ between the said lugs $e$ can be round, oval, demi-oval, rectangular, square or the like.

Instead of said lugs $e$, special cover plates $g$, $h$ (Figs. 10, 11) may be inserted in the heads of the metal spiral $a$ by providing in the cover plates cut-outs adapted to engage the metal spiral $a$. Alternatively, the cover plates $g$, $h$ may have blanked-out lugs $i$ for engaging the sheet metal spiral. To facilitate the fusion or welding, the blanked-out lugs $e$ and the cover plates $g$, $h$ may likewise have cut-outs $k$, and $m$, $n$, $o$ respectively, of any desired shape, see Figs. 10, 11, 12 and 22.

Figure 10:
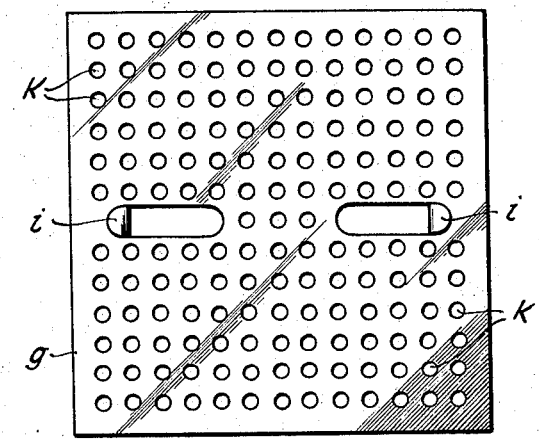
Figure 11:
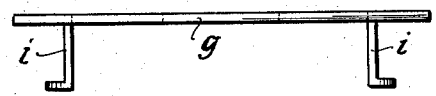
Figure 12:
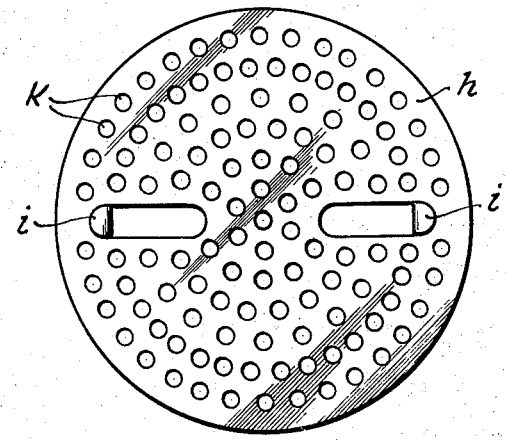
Figure 13:
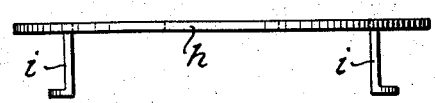
Figure 20:
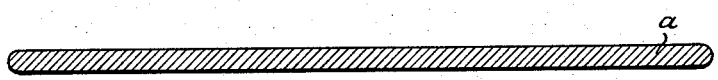

The blanked-out lugs $p$ of the sheet metal spiral $a$ may have small perforations $q$, see Fig. 21, which may be located in the crease, if desired. The strip of sheet metal $a$ may be wound tightly or loosely to afford adjustability with a view to improving the stability of the chaplet. This adjustability of the pitch of the spiral can be achieved by turning the cover plates engaging in the outside cut-outs $b$ in the metal strip $a$. The cover plates may be of round, square, rectangular, oval or any other shape (Figs. 10 and 12). Alternatively, the cover plates may, for example, take the shape of a hand wheel to facilitate any necessary adjustment by turning. Fig. 23 represents the development of a variant of the chaplet; in this case the cover plates $g$, $h$ can engage with their hook-shaped, blanked-out lugs $i$ the cut-outs $b$ arranged in a sloping line or in a helix so that the height of the chaplet can be varied by turning the cover plates.

The sheet metal spiral $a$ can be made from any desired metal or alloy sheet stock. Instead of making the webs or carrying cross-sections of the chaplets from the above described sheet metal spirals provided with blanked-out cut-outs, there may be used sheets of expanded metal which are bent parallel with or normal to the slots in the expanded metal so as to form a spiral.

What I claim is:

1. A chaplet, comprising, in combination, a carrying portion including wall means having an outer wall portion forming at least part of the periphery of said carrying portion and having an inner wall portion located within said outer wall portion inwardly spaced from the same, said inner wall portion having sections parallel to corresponding sections of said outer wall portion and said inner and outer wall portions having edge portions located in substantially parallel planes transverse to said wall portions; and a cover plate located in at least one of said substantially transverse planes and connected to said edge portion located therein.

2. A chaplet as defined in claim 1 wherein at least one of said wall portions is formed with cut-outs located in the vicinity of at least one of said edge portions, and said cover plate is formed with hook-shaped lugs adapted to engage said cut-outs.

3. A chaplet, comprising, in combination, a carrying portion including wall means having an outer wall portion forming at least part of the periphery of said carrying portion and having an inner wall portion located within said outer wall portion inwardly spaced from the same, said inner wall portion having sections parallel to corresponding sections of said outer wall portion and said inner and outer wall portions being formed with perforations and having edge portions located in substantially parallel planes transverse to said wall portions; and a cover plate located in at least one of said substantially transverse planes and connected to said edge portion located therein.

4. A chaplet as defined in claim 3 wherein at least one of said wall portions is formed with perforations located in the vicinity of at least one of said edge portions and also with perforations located farther distant from said one edge portion, said perforations in the vicinity of said edge portion being larger than the perforations farther distant from said one edge portion, and wherein said cover plate is formed with hook-shaped lugs adapted to engage said larger perforations.

5. A chaplet as defined in claim 3 wherein at least one of said wall portions is formed with first perforations located in the vicinity of at least one of said edge portions and extending along a line sloping from said edge portion towards the center of said wall means, and also with second perforations located farther distant from said one edge portion, said first perforations being larger than said second perforations, and wherein said cover plate is formed with hook-shaped lugs adapted to engage said larger perforations.

References Cited in the file of this patent

UNITED STATES PATENTS

| D. 28,763 | Burdick | May 31, 1898 |
| 636,438 | Lovejoy | Nov. 7, 1899 |

FOREIGN PATENTS

| 559,308 | France | June 23, 1923 |
| 477,967 | Canada | Oct. 23, 1951 |

OTHER REFERENCES

Fanner Manufacturing Co. of Brookside Park, Cleveland 1, Ohio; catalog 1050, October 1950, titled "Fanner Chaplets," page 24.